United States Patent [19]

Fujitsuka

[11] Patent Number: 4,838,020
[45] Date of Patent: Jun. 13, 1989

[54] TURBOCOMPRESSOR SYSTEM AND METHOD FOR CONTROLLING THE SAME

[75] Inventor: Masashi Fujitsuka, Kobe, Japan

[73] Assignee: Mitsubishi Denki Kabushiki Kaisha, Japan

[21] Appl. No.: 183,350

[22] Filed: Apr. 12, 1988

Related U.S. Application Data

[63] Continuation of Ser. No. 921,425, Oct. 22, 1986, abandoned.

[30] Foreign Application Priority Data

Oct. 24, 1985 [JP] Japan .................. 60-236426
Oct. 25, 1985 [JP] Japan .................. 60-237477
Oct. 30, 1985 [JP] Japan .................. 60-241308
Nov. 20, 1985 [JP] Japan .................. 60-258640

[51] Int. Cl.⁴ .................. F02C 7/26; H01M 8/04
[52] U.S. Cl. .................. 60/39.07; 60/602; 429/22; 429/25; 429/13
[58] Field of Search .................. 429/13, 22, 17, 19, 429/20, 25; 60/39.07, 39.25, 602, 606

[56] References Cited

U.S. PATENT DOCUMENTS 3,972,731  8/1976  Bloomfield et al. .......... 429/17
4,685,287  8/1987  Takuma .................. 60/39.07

FOREIGN PATENT DOCUMENTS 12268   1/1983  Japan .................. 429/25
166670 10/1983  Japan .................. 429/25
166671 10/1983  Japan .................. 429/25
39771   3/1985  Japan .................. 429/25
124361  7/1985  Japan .
157163  8/1985  Japan .................. 425/25
189175  9/1985  Japan .
262364 12/1985  Japan .
80764   4/1986  Japan .
80765   4/1986  Japan .

*Primary Examiner*—John F. Niebling
*Assistant Examiner*—Steven P. Marquis
*Attorney, Agent, or Firm*—Leydig, Voit & Mayer

[57] ABSTRACT

A turbocompressor system and a method for controlling the same are disclosed in which an appropriate amount of air can be supplied from a compressor to a load section in accordance with varying requirements of the load section, and in which the pressure of air delivered from the compressor can be maintained constant at all times irrespective of operating conditions of the system such as load-varying transitional operation or steady-state operation. A turbine for driving the compressor is driven to run by exhaust gas discharged from the load section, and the output power of the turbine is controlled to be constant in various ways in a feedback manner.

48 Claims, 6 Drawing Sheets

TURBOCOMPRESSOR SYSTEM AND METHOD FOR CONTROLLING THE SAME

This application is a continuation of application Ser. No. 921,425, filed Oct. 22, 1986, now abandoned.

BACKGROUND OF THE INVENTION

1. Field of the Invention

This invention relates to a turbocompressor system and a method for controlling the same, and more particularly, to such a turbocompressor system which includes a load requiring air for its operation and discharging exhaust gas, a compressor connected with the load for supplying compressed air to the load, and a turbine connected with the load and adapted to be driven by the exhaust gas discharged from the load, the turbine being operably connected with the compressor for driving thereof.

2. Description of the Prior Art

A conventional turbocompressor system of the kind described above incorporated in a fuel cell power plant is illustrated in FIG. 6.

Such a fuel cell power plant is generally high in thermal efficiency and has less influence on the environment and greater versatility in sites of installation as compared with a steam power plant employing fossil fuel such as petroleum, coal or the like. Therefore, in recent years, fuel cell power plants have been employed for special purposes such as space developments and various considerations have been made about uses of fuel cell power plants including their use as commercial power plants. Many developments of such commercial fuel cell power plants have been made in order to reduce them to practice.

In general, a fuel cell power plant system comprises a fuel cell body having electrodes of air and fuel with a layer of electrolyte interposed therebetween, a reformer for reforming a hydrocarbon fuel such as natural gas and supplying hydrogen gas as fuel to the fuel cell body, and an air-supplying means for supplying air to the air electrode of the fuel cell body and to the reformer. The performance of the fuel cell body tends to be improved as the pressures of the reaction gases increase. Consequently, the operating pressures of the respective reaction gases are commonly maintained within a range of 4 to 6 $kg/cm^2$. In this connection, compression of air requires great power which often occupies as much as about 20 percent of the energy produced by the fuel cell body. On the other hand, reforming reaction carried out in the reformer for producing fuel gas for the fuel cell body takes place at a high temperature of about 800° C. so that exhaust gas of high temperatures is discharged from the reformer. For this reason, if power for compressing air is obtained from the energy of exhaust gas from the reformer, the efficiency of the entire system will b substantially improved.

In view of the above, the conventional fuel cell power plant systems generally employ a turbocompressor as an air-supplying means. Specifically, the turbocompressor comprises a turbine adapted to be driven to run by surplus air from the air electrode of the fuel cell body and the combustion exhaust gas from the reformer, and a compressor coaxially connected with the turbine and adapted to be driven by the turbine for supplying compressed air to the fuel cell body and the reformer as required. The exhaust gas energy is thus recovered by the turbine so as to be utilized to compress air, thereby improving the efficiency of the entire fuel cell power plant system.

In such a fuel cell power plant system, wide and swift load-responsive control is required as a so-called power plant system. Particularly, it is necessary to variably control the amount of air supplied to the fuel cell body and the reformer in a wide range of, for example, from 25 to 100 percent. On the other hand, it is required from the point of view of maintaining the intended characteristics of the fuel cell body -that the- pressure of air to be supplied to the fuel cell body be maintained at a constant value even during a period of change in load in order to reduce a pressure differential between the pressure at the air electrode side and the pressure at the fuel electrode side thereby to prevent gas leakage between these electrodes or a crossover phenomenon.

In order to cope with the above-described problem, there has been proposed a fuel cell power plant system incorporating a turbocompressor system which is illustrated in FIG. 6. In FIG. 6, the turbocompressor system illustrated comprises a load section 1 including a fuel cell body (not shown) and a reformer (not shown) for reforming hydrocarbon fuel into a hydrogen enriched gas, the load section 1 thus constituting a compressed-air consuming portion in a fuel cell power plant system, and a turbocompressor 2 including a turbine 2a and a compressor 2b coaxially connected with each other through a single rotary shaft with a flow control valve 2c in the form of a variable nozzle being disposed at an inlet side of the turbine 2a. Compressed air delivered from the compressor 2b is fed to the load section 1 through an air conduit 9 from which a vent passage 11 is branched for venting part of the compressed air delivered from the compressor 2b to the ambient atmosphere. Disposed in the vent passage 11 is a vent valve 3, the opening degree of which is controlled by a computing element 6 having an electronic control circuit which is in turn controlled by a pressure controller 5 in response to the pressure of air from the compressor 2b detected by a pressure detector 4. Thus, the pressure of air from the compressor 2b is appropriately controlled by the vent valve 3 in response to the detected pressure of air from the compressor 2b. A flow-rate control valve 7 is disposed in the air conduit 9 and adapted to be controlled by a flow-rate controller 8 so as to adjust the flow rate of compressed air supplied from the compressor 2b to the load section 1 in an appropriate manner.

On the other hand, exhaust gases, discharged from the load section 1 and including combustion exhaust gas from a reformer (not shown) and surplus air from the fuel cell body (not shown), are introduced through an exhaust conduit 10 to the turbine 2a.

In order to compensate for shortage of the turbine power of the turbocompressor 2, an auxiliary burner 12 is disposed in the exhaust conduit 10. The auxiliary burner 12 is fed with compressed air from the compressor 2b through a branch conduit 16 branched from the air conduit 9, and with fuel through a fuel conduit 13. A flow-rate control valve 14 is dispose in the fuel conduit 13 for regulating the flow rate of fuel fed from a fuel source (not shown) to the auxiliary burner 12 through the fuel conduit 13, and a flow-rate control valve 17 is likewise disposed in the branch conduit 16 for regulating the flow rate of air fed to the auxiliary burner 12 through the branch conduit 16. The flow-rate control valves 14 and 17 are controlled by flow-rate controllers 15 and 18, respectively, which are in turn controlled by a pressure controller 19 associated with the pressure detector 4 in a manner such that the flow rates of fuel and air supplied to the auxiliary burner 12 are appropriately regulated in response to the pressure of compressed air from the compressor 2b detected by the pressure detector 4. The fuel and the compressed air thus properly regulated by the flow-rate control valves 14 and 17 are supplied to the auxiliary burner 12 and combusted therein, thereby affording thermal energy to the exhaust gas which is fed from the load section 1 to the turbine 2a through the exhaust conduit 10.

A bypass conduit 20 is branched from the exhaust conduit 10 at a location upstream of the flow control valve 2c on the inlet side of the turbine 2a with a bypass valve 21 being inserted in the bypass conduit 20 for regulating the flow rate of exhaust gases flowing therethrough. The bypass valve 21 is controlled by a pressure controller 23 through a computing element 24 having an electronic control circuit in response to the pressure of exhaust gases fed to the turbine 2a which is detected by a pressure detector 22. The computing element 24 acts to adjust an operating signal fed from the pressure controller 23 to the bypass valve 21 in response to the operating conditions of the turbocompressor 2, that is in response to the steady-state operating condition or the transition-state operating condition of the turbocompressor 2. The opening degree of the flow control valve 2c is controlled by a nozzle controller 25 which is in turn controlled in accordance with a load command signal issued from an appropriate load-detecting means or the like, herein shown as a load detector 26.

In operation, when the system is under steady-state operation, that is when the turbocompressor 2 is in steady-state operation, the vent valve 3 and the bypass valve 21 are held completely closed or slightly opened to certain limited degrees of opening so that the pressure controllers 5 and 23 are substantially out of operation. Such complete closing or limited opening of the vent valve 3 and the bypass valve 21 is to reduce energy loss to a minimum during the steady-state operating condition of the system. In this case, the system is in the steady-state operation and hence all the process values in the system should be intrinsically maintained constant, but in fact, the process values such as temperature, pressure or the like will gradually change due to variation in suction conditions of the compressor 2b and/or variation in the amount of heat radiation of the system resulting from change in the external temperature and/or moisture during operation of the system. It is important to maintain the pressure of air delivered from the compressor 2b at a constant value at all times irrespective of such variation in the process values, as referred to above. In this regard, the air pressure delivered from the compressor 2b is regulated by controlling the combustion of fuel in the auxiliary burner 12 by means of the pressure controller 19 through the intermediary of the flow-rate controllers 15 and 18 in a manner such that the pressure of air from the compressor 2b detected by the pressure detector 4 is made to be at a predetermined constant value. Specifically, in the steady-state operation of the system, by controlling the combustion of fuel in the auxiliary burner 12, the pressure of air delivered from the compressor 2b is regulated to fall within a specified range in a feedback manner.

Now, description will be made of the operation of the system at the time when the load on the system varies. In this case, the computing elements 6 and 24 are first controlled, prior to issuance of a load command signal by the appropriate load detector 26, so as to place the vent valve 3 under the control of the pressure controller 5 and the bypass valve 21 under the control of the pressure controller 23, respectively. Then, preset values for the flow rates of fuel and air to be fed to the auxiliary burner 12 are directly given as load command signals to the flow-rate controllers 15 and 18 so as to increase the output power of the turbine 2a. As a result, the pressure of air from the compressor 2b, being about to increase, is controlled to be constant by appropriately adjusting the opening degree of the vent valve 3 by means of the pressure controller 5. Thus, upon issuance of a load signal, the output power of the turbine 2a is increased by controlling the combustion in the auxiliary burner 12 in a feedforward manner and a part of the air from the compressor 2b thus increased is vented through the vent conduit 11 at an outlet side of the compressor 2b to the ambient atmosphere so as to adjust the pressure of air delivered from the compressor 2b at a constant value. In this manner, the output power of the turbocompressor 2 is increased to fulfill the amount of air required of the system.

When the flow rate of air discharged to the atmosphere through the vent valve 3 reaches a prescribed level, that is when the opening degree of the vent valve 3 reaches a prescribed level, the flow-rate control valve 7 in the air conduit 9 is caused to open in accordance with the requirement of the load section 1 so that an appropriate amount of air is supplied from the compressor 2b to the load section 1. In this connection, it is to be noted that on the basis of load command signals appropriately preprogrammed, the opening degree of the variable flow control valve 2c for the turbine 2a is varied in a feedforward control manner so as to cope with the changing flow rate of the exhaust gas discharged from the load section 1 to the turbine 2a. More particularly, as the opening degree of the flow-rate control valve 7 in the air conduit 9 is changed, the flow rate of exhaust gases from the system is changed in an increasing or decreasing sense, as a consequence of which the control system is preprogrammed such that the opening degree of the flow control valve 2c is so controlled as to compensate for the above change in the flow rate of the exhaust gases. In this connection, it is to be noted that in this control system, the opening degree of the flow control valve 2c is controlled in a relatively rough way and a fine control on the pressure of the exhaust gases at the inlet side of the turbine 2a is effected by adjusting the opening degree of the bypass valve 21 under the action of the pressure controller 23 through the computing element 24.

A prescribed value for the flow rate of air fed to the load section 1 is directly given, as a load command signal, to the flow-rate controller 8 so that the opening degree of the flow-rate control valve 7 is thereby adjusted in an appropriate manner, and at the same time, a prescribed value for the opening degree of the flow control valve 2c is given, as a load command signal, to the nozzle controller 25 so as to adjust the opening degree of the flow control valve 2c to the prescribed value. In this case, even if the pressure of exhaust gases at the inlet side of the turbine 2a is about to be varied for some reason, it is maintained at a constant level by appropriate adjustment of the opening degree of the bypass valve 21 due to the action of the pressure controller 23, that is by adjusting the amount of exhaust gases discharged to the outside through the bypass conduit 20.

Subsequently, when the change in the operating state of the system induced by the load command signal has been completed and the operating state of the system becomes stabilized or comes into a steady state, the delivery pressure of air from the compressor 2b is then controlled by the pressure controller 19, and the opening degrees of the vent valve 3 and the bypass valve 21 are gradually reduced to the fully closed states or certain limited degrees of opening under the action of the computing elements 6 and 24. Such operations of gradually decreasing the opening degrees of the vent valve 3 and the bypass valve 21 are to reduce energy loss of the system to a minimum, as described in the foregoing, and are effected in a finely adjusted manner so as to avoid destroying the control balance on the turbocompressor 2. During such operations, the delivery pressure of the compressor 2b is controlled to be constant by appropriately adjusting the combustion of fuel in the auxiliary burner 12 through the action of the flow-rate controllers 15 and 18. After the vent valve 3 and the bypass valve 21 have been closed completely or to the certain limited degrees of opening, the system returns to the steady-state operating condition under loading.

According to the above-described control process, the bypass valve 21 and the vent valve 3 are maintained in their fully closed or slightly opened states in the steady-state operating condition of the system, and in these states, the delivery pressure of the compressor 2b is adjusted to be constant under the combustion control of the auxiliary burner 12 so that energy loss of the system is reduced to a minimum within the range in which there is no shortage of the turbine output power. On the other hand, in cases where the load on the system changes, both the combustion of fuel in the auxiliary burner 12 and the opening degree of the flow control valve 2c for the turbine 2a are controlled in a feedforward manner in accordance with a preset program. In this case, the pressure of exhaust gases fed to the turbine 2a is controlled to be constant by means of the bypass valve 21 in a feedback manner, and at the same time, the pressure of air delivered from the compressor 2b is also controlled to be constant by means of the vent valve 3 in a feedback manner so that the instantaneously increased amounts of exhaust gases discharged from the load section 1 and air delivered from the compressor 2b are discharged to the ambient atmosphere through the bypass passage 20 and the vent passage 11. In this manner, the pressure of exhaust gases at the inlet side of the turbine 2a and the pressure of air delivered from the compressor 2b are always maintained at respective constant values in a positive manner whereby the pressures of the respective reaction gases inside the fuel cell body (the load section 1) as well as a pressure differential between the reaction gas pressures and the nitrogen gas pressure in the fuel cell body can be maintained constant at all times.

In this connection, it is to be noted that the turbine power is in direct proportion to a root of the absolute temperature T of the exhaust gases at the inlet side of the turbine 2a and the cross sectional area S of the flow control valve 2c. Accordingly, by controlling not only the combustion of fuel in the auxiliary burner 12 but also the cross sectional area (or the opening degree) of the flow control valve 2c, the output power of the turbine 2a can be increased to a desired value with the inlet temperature (or exhaust gas temperature) of the turbine 2a being suppressed to be relatively low. Therefore, the pressure of exhaust gases at the inlet side of the turbine 2a can be maintained constant at all times, and the time required for causing a load change can be shortened without difficulty.

The fuel cell power plant system employing the conventional turbocompressor system as described above, however, involves the following problems. Specifically, due to the fact that, particularly at the time of variation in load, the opening degree of the flow control valve 2c and/or the flow rate of fuel to be supplied to the auxiliary burner 12 are controlled in accordance with a preset program in a feedforward manner, it is necessary to determine beforehand varying degrees of opening of the flow control valve 2c and/or varying amounts of fuel to be supplied to the auxiliary burner 12 (referred to as the amount of auxiliary fuel hereinafter) which are considered to be most suited to a variety of loading conditions of the system. In particular, during such a period of load variation, the respective process variables of the system are changing rapidly, and thus it is difficult to determine, from moment to moment, the optimal opening degree of the variable nozzle 2c and/or the optimal flow rate of auxiliary fuel in response to the changing process values at various load-changing times. In addition, in spite of the fact that the opening degree of the flow control valve 2c has great influence on the delivery pressure of air from the compressor 2b, a computing element for determining an appropriate degree of the flow control valve 2c is required separately from means for directly controlling the compressor delivery air pressure to be at a prescribed value. Furthermore, in order to maintain the exhaust gas pressure at the inlet side of the turbine 2a substantially constant, it has been considered to adjust the opening degree of the bypass valve 21 so as to control the exhaust gas pressure at the inlet side of the turbine 2a in a feedback manner. Such a control measure, however, does not provide any good result in the event that the exhaust gas pressure at the inlet side of the turbine 2a is still low at the time when the bypass valve 21 has been fully closed. Accordingly, if the exhaust gas pressure at the inlet side of the turbine 2a is not maintained constant, the combustion of fuel in the auxiliary burner 12 and hence the output power of the turbine 12 will become unstable.

SUMMARY OF THE INVENTION

In view of the above, the present invention is intended to obviate the above-described problems of the prior art.

A primary object of the present invention is to provide a turbocompressor system and a method for controlling the same which are capable of maintaining the delivery pressure of air from a compressor constant at all times.

Another object of the present invention is to provide a novel and improved turbocompressor system of the kind described and a method for controlling the same which are capable of not only maintaining the delivery pressure of air from a compressor constant but also timely determining an optimal opening degree of a flow control valve at an inlet side of a turbine in response to the compressor delivery air pressure.

A further object of the present invention is to provide a turbocompressor system and a method for controlling the same which are capable of maintaining the exhaust gas pressure at an inlet side of a turbine constant at all times.

A still further object of the present invention is to provide a turbocompressor system and a method for controlling the same which are capable of maintaining the flow rates of auxiliary fuel and air to be supplied to an auxiliary burner at respective minimum levels just necessary for continuing the combustion even if variation in load is great.

A yet further object of the present invention is to provide a turbocompressor system and a method for controlling the same in which there is no need for determining beforehand the respective feedforward amounts of auxiliary fuel to be supplied to an auxiliary burner, and which are capable of maintaining the exhaust gas pressure at the inlet side of the turbine constant at all times irrespective of operating conditions of the system such as load-varying transitional operation or steady-state operation.

In order to achieve the above objects, according to one aspect of the present invention, there is provided a turbocompressor system which comprises:

a load section requiring air for its operation and discharging exhaust gas;

a compressor connected with the load section for supplying compressed air to the load section;

a turbine connected with the load section and adapted to be driven by the exhaust gas discharged from the load section, the turbine being operably connected with the compressor for driving thereof;

a flow control valve disposed at an inlet side of the turbine for controlling a flow rate of the exhaust gas supplied from the load section to the turbine; and a control means for controlling the opening degree of the flow control valve in response to the pressure of air delivered from the compressor whereby the pressure of air supplied from the compressor to the load section is adjusted to a predetermined value in a feedback manner.

According to another aspect of the present invention, there is provided a turbocompressor system which comprises:

a load section requiring air for its operation and discharging exhaust gas;

a compressor connected with the load section for supplying compressed air to the load section;

a turbine connected with the load section and adapted to be driven by the exhaust gas discharged from the load section, the turbine being operably connected with the compressor for driving thereof;

an auxiliary burner disposed in a conduit connecting between the load section and the turbine for increasing the output power of the turbine; and a control means for controlling the combustion of fuel in the auxiliary burner in response to the pressure of exhaust gases discharged from the load section and the auxiliary burner to the turbine whereby the pressure of the exhaust gases at an inlet side of the turbine is adjusted to a predetermined level in a feedback manner.

According to a further aspect of the present invention, there is provided a turbocompressor system which comprises:

a load section requiring air for its operation and discharging exhaust gas;

a compressor connected with the load section for supplying compressed air to the load section;

a turbine connected with the load section and adapted to be driven by the exhaust gas discharged from the load section, the turbine being operably connected with the compressor for driving thereof;

a flow control valve disposed at an inlet side of the turbine for controlling a flow rate of the exhaust gas supplied from the load section to the turbine;

a vent passage branched from a passage connecting between the compressor and the load section for venting a part of the air delivered from the compressor to the ambient atmosphere;

a vent valve disposed in the vent passage for controlling the amount of the air vented from the compressor to the atmosphere; and a control means for controlling the opening degree of the flow control valve in response to the pressure of the air delivered from the compressor whereby the pressure of the air supplied from the compressor to the load section is adjusted to a first predetermined value in a feedback manner, the control means being also adapted to control the opening degree of the vent valve in response to the pressure of the air delivered from the compressor whereby the pressure of the air supplied from the compressor to the load section is adjusted to a second predetermined value higher than the first predetermined value in a feedback manner.

According to a still further aspect of the present invention, there is provided a turbocompressor system which comprises:

a load section requiring air for its operation and discharging exhaust gas;

a compressor connected with the load section for supplying compressed air to the load section;

a turbine connected with the load section and adapted to be driven by the exhaust gas discharged from the load section, the turbine being operably connected with the compressor for driving thereof;

an auxiliary burner disposed in a conduit connecting between the load section and the turbine for increasing the output power of the turbine;

a first control means for controlling the combustion of fuel in the auxiliary burner in response to the pressure of the exhaust gases discharged from the load section and the auxiliary burner to the turbine whereby the pressure of the exhaust gases at an inlet side of the turbine is adjusted to a first predetermined level in a feedback manner;

a bypass passage branched from a conduit connecting between the auxiliary burner and the turbine for bypassing a part of the exhaust gases from the load section and the auxiliary burner toward the ambient atmosphere;

a bypass valve disposed in the bypass passage for controlling the flow rate of the exhaust gases discharged to the atmosphere bypassing the turbine; and a second control means for controlling the opening degree of the bypass valve in response to the pressure of the exhaust gases discharged from the load section and the auxiliary burner to the turbine whereby the pressure of the exhaust gases at an inlet said of the turbine is adjusted to a second predetermined level higher than the first predetermined level in a feedback manner.

According to a further aspect of the present invention, there is provided a method for controlling a turbocompressor system which comprises:

supplying compressed air from a compressor to a load section;

feeding exhaust gas discharged from the load section to a turbine through a flow control valve for driving the turbine which is operably connected with the compressor, the flow control valve being disposed at an inlet side of the turbine for controlling a flow rate of the exhaust gas supplied from the load section to the turbine; and controlling the opening degree of the flow control valve in response to the pressure of the air delivered from the compressor whereby the pressure of the air supplied from the compressor to the load section is adjusted to a predetermined value in a feedback manner.

According to a still further aspect of the present invention, there is provided a method for controlling a turbocompressor system which comprises:

supplying compressed air from a compressor to a load section;

feeding exhaust gas discharged from the load section to a turbine through an auxiliary burner for driving the turbine which is operably connected with the compressor, the auxiliary burner being disposed in a conduit connecting between the load section and the turbine for increasing the output power of the turbine; and controlling the combustion of fuel in the auxiliary burner in response to the pressure of the exhaust gases discharged from the load section and the auxiliary burner to the turbine whereby the pressure of the exhaust gases at an inlet side of the turbine is adjusted to a predetermined level in a feedback manner.

According to a yet further aspect of the present invention, there is provided a method for controlling a turbocompressor system which comprises:

supplying compressed air from a compressor to a load section;

feeding exhaust gas discharged from the load section to a turbine through a flow control valve for driving the turbine which is operably connected with the compressor, the flow control valve being disposed at an inlet side of the turbine for controlling a flow rate of the exhaust gas supplied from the load section to the turbine;

venting a part of the air delivered from the compressor to the ambient atmosphere through a vent passage branched from a passage connecting between the compressor and the load section;

adjusting the amount of the air vented from the compressor to the atmosphere through the vent passage by means of a vent valve disposed therein;

controlling the opening degree of the flow control valve in response to the pressure of the air delivered from the compressor whereby the pressure of the air supplied from the compressor to the load section is adjusted to a first predetermined value in a feedback manner; and further controlling the opening degree of the vent valve in response to the pressure of the air delivered from the compressor whereby the pressure of the air supplied from the compressor to the load section is adjusted to a second predetermined value higher than the first predetermined value in a feedback manner.

According to a further aspect of the present invention, there is provided a method for controlling a turbocompressor system which comprises:

supplying compressed air from a compressor to a load section;

feeding exhaust gas discharged from the load section to a turbine through an auxiliary burner for driving the turbine which is operably connected with the compressor, the auxiliary burner being disposed in a conduit connecting between the load section and the turbine for increasing the output power of the turbine;

controlling the combustion of fuel in the auxiliary burner in response to the pressure of the exhaust gases discharged from the load section and the auxiliary burner to the turbine whereby the pressure of the exhaust gases at an inlet side of the turbine is adjusted to a first predetermined level in a feedback manner;

bypassing a part of the exhaust gases from the load section and the auxiliary burner toward the ambient atmosphere;

controlling the flow rate of exhaust gases discharged to the atmosphere bypassing the turbine by means of a bypass valve disposed in the bypass passage; and controlling the opening degree of the bypass valve in response to the pressure of the exhaust gases discharged from the load section and the auxiliary burner to the turbine whereby the pressure of the exhaust gases at an inlet side of the turbine is adjusted to a second predetermined level higher than the first predetermined level in a feedback manner.

According to a further aspect of the present invention, there is provided a method for controlling a fuel cell power plant system which comprises:

reforming a hydrocarbon fuel into a hydrogen enriched gas by means of a reformer;

supplying the hydrogen enriched gas to a fuel cell body having a fuel electrode and an air electrode;

feeding exhaust gas discharged from the reformer or surplus air at an outlet of the air electrode to a turbocompressor having a turbine and a compressor through a flow control valve for driving the turbine;

driving the compressor by means of the turbine for supplying compressed air to the fuel cell body and the reformer; and controlling the opening degree of the flow control valve so as to control the delivery pressure of compressed air from the compressor in a feedback manner.

The above and other objects, features and advantages of the present invention will become apparent from the following detailed description of several presently preferred embodiments of the invention when taken in conjunction with the accompanying drawings.

DESCRIPTION OF THE PREFERRED EMBODIMENTS

Figure 1:
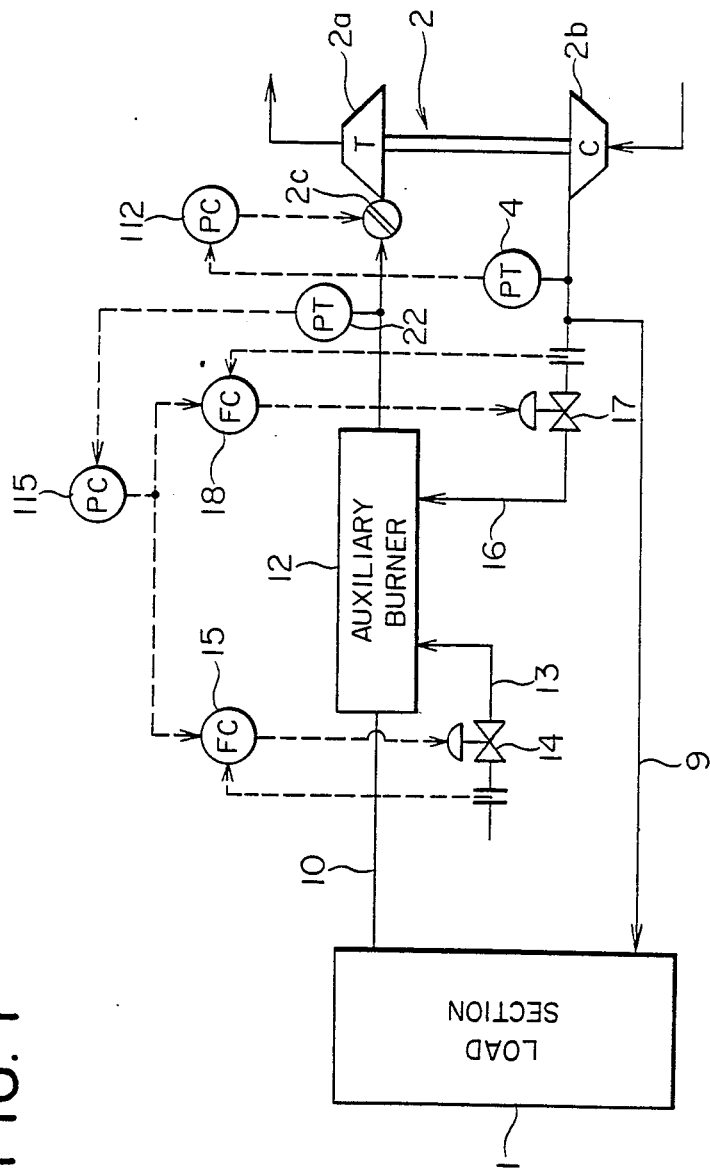
FIG. 1 is a circuit diagram showing a turbocompressor system in accordance with a first embodiment of the present invention.

Now, the present invention will be described in detail with reference to several presently preferred embodiments thereof illustrated in the accompanying drawings. In the following, the same or corresponding parts or elements of the embodiments are identified by the same reference numerals or characters as employed in FIG. 6.

FIG. 1 shows a circuit diagram of a turbocompressor system constructed in accordance with a first embodiment of the present invention. In FIG. 1, the turbocompressor system illustrated is applied to a fuel cell power plant system and comprises a load section 1 such as, for example, a fuel cell body, a reformer and the like of the fuel cell power plant system, the load section 1 requiring air for its operation and discharging exhaust gas; a turbocompressor 2 including a turbine 2a connected through an exhaust conduit 10 to the load section 1 and a compressor 2b connected through an air conduit 9 to the load section 1, the turbine 2a and the compressor 2b being coaxially connected with each other through a single rotary shaft; an auxiliary burner 12 disposed in the exhaust conduit 10 between the load section 1 and the turbine 2a for increasing the output power of the turbine 2a; a first control means for controlling the combustion of fuel in the auxiliary burner 12 in response to the pressure of the exhaust gases discharged from the load section 1 and the auxiliary burner 12 to the turbine 2a; a flow control valve 2c in the form of a variable nozzle disposed at an inlet side of the turbine 2a for controlling the flow rate of the exhaust gases supplied from the load section 1 and the auxiliary burner 12 to the turbine 2a through the exhaust conduit 10; and a second control means for controlling the opening degree of the flow control valve 2c in response to the pressure of the air delivered from the compressor 2b. The turbine 2a is driven to run by the exhaust gases discharged from the load section 1 and the auxiliary burner 12 so as to rotate the compressor 2b which acts to deliver compressed air to the load section 1 via the air conduit 9.

The auxiliary burner 12 is supplied with air from the compressor 2b through the air conduit 9 and a branch conduit 16 branched from the air conduit 9, and with fuel from a fuel source (not shown) through a fuel conduit 13 so that the fuel is combusted with the air to produce exhaust gas which is merged with exhaust gas discharged from the load section 1 so as to be fed to the turbine 2a via the exhaust conduit 10.

The first control means comprises flow-rate control valves 14 and 17 disposed in the fuel conduit 13 and the branch conduit 16, respectively, and a pressure controller 115 associated with a pressure detector 22, which is connected with the exhaust conduit 10 at a location between the auxiliary burner 12 and the flow control valve 2c for detecting the pressure of exhaust gases in the exhaust conduit 10 discharged from the load section 1 and the auxiliary burner 12, the pressure controller 115 being adapted to control the opening degrees of the valves 14 and 17 through the intermediary of flow-rate controllers 15 and 18, respectively, in response to the pressure of the exhaust gases detected by the pressure detector 22 in a manner such that the pressure of the exhaust gases at the inlet side of the turbine 2a can be adjusted at a predetermined value. In this manner, the combustion of fuel in the auxiliary burner 12 is controlled in response to the pressure of the exhaust gases discharged from the load section 1 and the auxiliary burner 12, thereby appropriately adjusting the output power of the turbine 2a.

The second control means for controlling the opening degree of the flow control valve 2c comprises a pressure detector connected with the air conduit 9 at a location near an outlet side of the compressor 2b for detecting pressure of the compressed air discharged from the compressor 2b, and a pressure controller 112 associated with the pressure detector 4 for controlling the opening degree of the flow control valve 2c in response to the detected air pressure discharged from the compressor 2b in a feedback manner such that the pressure of the exhaust gases in the exhaust conduit 10 at the inlet side of the turbine 2a is at a predetermined value.

In operation of the above-described embodiment, if the exhaust gas pressure in the exhaust conduit 10 at the inlet side of the turbine 2a detected by the pressure detector 22 is lower than a predetermined value, that is if the combustion (or the intensity of combustion) of fuel in the auxiliary burner 12 is insufficient, the pressure controller 115 acts to send out a command signal to the flow-rate controllers 15 and 18 in order to increase the amount of fuel to be supplied to the auxiliary burner 15 through the fuel conduit 13, as a result of which the flow-rate controllers 15 and 18 operate to increase the opening degrees of the flow control valves 14 and 17, respectively, so as to increase the respective flow rates of fuel and air flowing through the fuel conduit 13 and the branch conduit 16 to respective values instructed by the command signal from the pressure controller 115. As a result, the combustion of fuel in the auxiliary burner 12 will be intensified so that the amount of the exhaust gas discharged from the auxiliary burner 12 increases and at the same time, the exhaust gas discharged from the load section 1 to the turbine 2a through the exhaust conduit 10 is heated to a higher temperature by the exhaust gas from the auxiliary burner 12, thereby effectively increasing the exhaust gas pressure at the inlet side of the turbine 2a to a predetermined level. Consequently, the output power of the turbine 2a is increased, enabling the compressor 2b to supply an increased amount of air to the load section 1.

On the other hand, the pressure of air delivered from the compressor 2b is determined by a balance between the flow rate of air supplied from the compressor 2b to the load section 1 and the auxiliary burner 12, and the flow rate of air delivered from the compressor 2b. Also, if the compressor delivery air pressure is constant, the amount of air delivered from the compressor 2b is in proportion to the output power of the turbine 2a which is in turn proportional to a square root of the exhaust gas temperature (absolute temperature) at the inlet side of the turbine 2a and the opening degree of the flow control valve 2c if the exhaust gas pressure at the inlet side of the turbine 2a is constant. Accordingly, if the delivery pressure of compressed air from the compressor 2b detected by the pressure detector 4 is lower than a predetermined value, the amount of air delivered from the compressor 2b and hence the output power of the turbine 2a are in short. In such cases, the pressure controller 112 operates, in response to the detected pressure of the compressed air from the compressor 2b, to increase the opening degree of the flow control valve 2c whereby the output power of the turbine 2a and hence the amount of compressed air delivered from the compressor 2b are increased, thus raising the compressor delivery air pressure to a predetermined value.

In this connection, it is to be noted that as the opening degree of the flow control valve 2c increases, the flow rate of the exhaust gases at the inlet side of the turbine 2a increases and the pressure of the exhaust gases at the inlet side of the turbine 2a decreases, but the exhaust gas pressure is maintained at a predetermined level under the action of the pressure controller 115.

Figure 6:
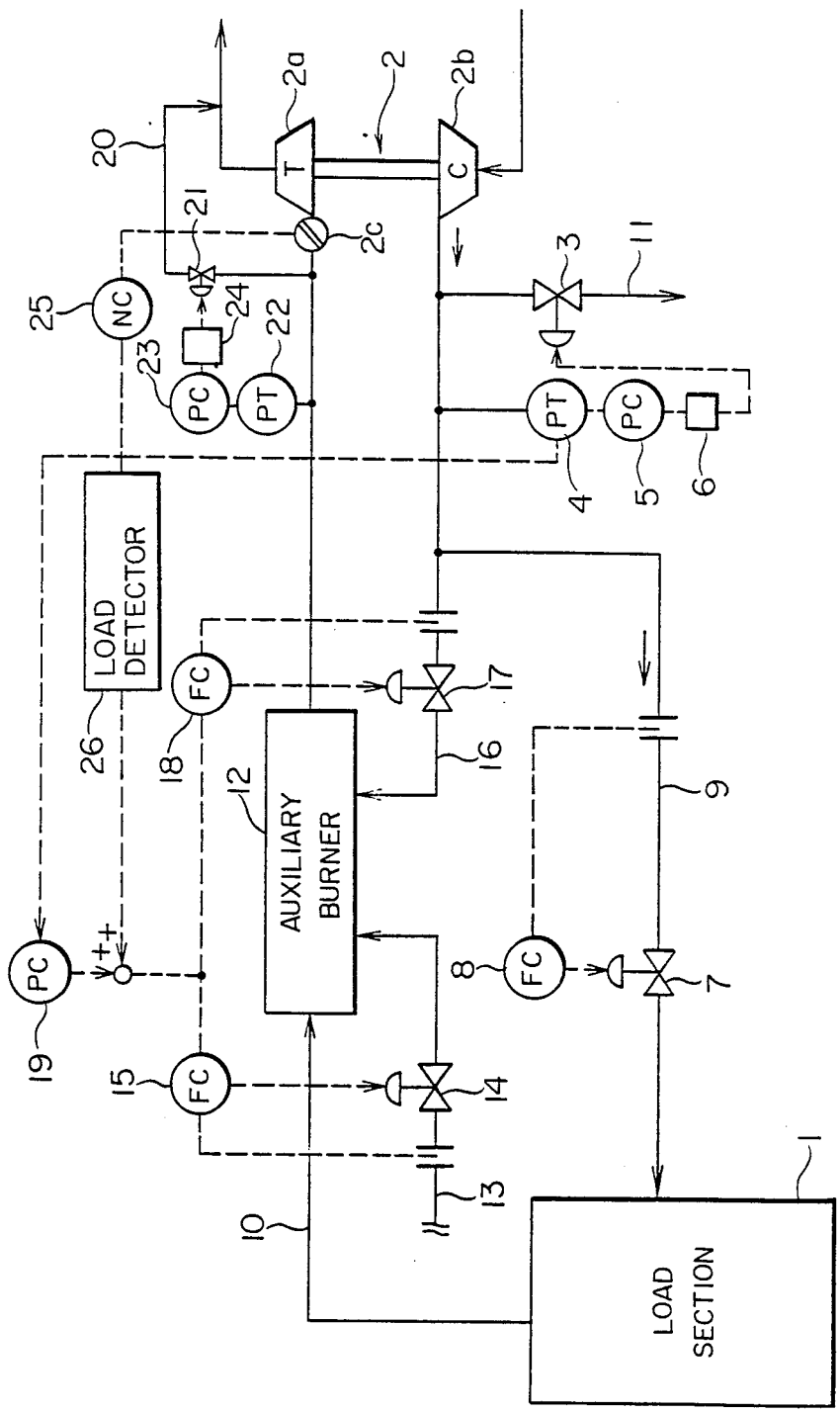
FIG. 6 is a circuit diagram showing a conventional turbocompressor system.

Although in the above-described embodiment, the delivery pressure of air from the compressor 2b is controlled to be at a predetermined value by appropriately adjusting the opening degree of the flow control valve 2c under the action of the pressure controller 112, such control on the compressor delivery pressure can be made by appropriately adjusting the opening degree of a vent valve in a vent passage by means of a pressure controller so as to vent a part of the air delivered from the compressor 2b to the ambient atmosphere, as in the conventional turbocompressor system illustrated in FIG. 6. Also, control on the opening degree of the flow control valve 2c is effected in a feedback manner by adjusting the compressor delivery pressure by means of the pressure controller 112, but instead this control can be made in a feedforward manner in accordance with the load on the load section 1.

Moreover, the flow control valve 2c may be omitted, or the second control means including the pressure detector 4 and the pressure controller 112 for controlling the compressor delivery pressure at a predetermined level may be omitted.

Figure 2:
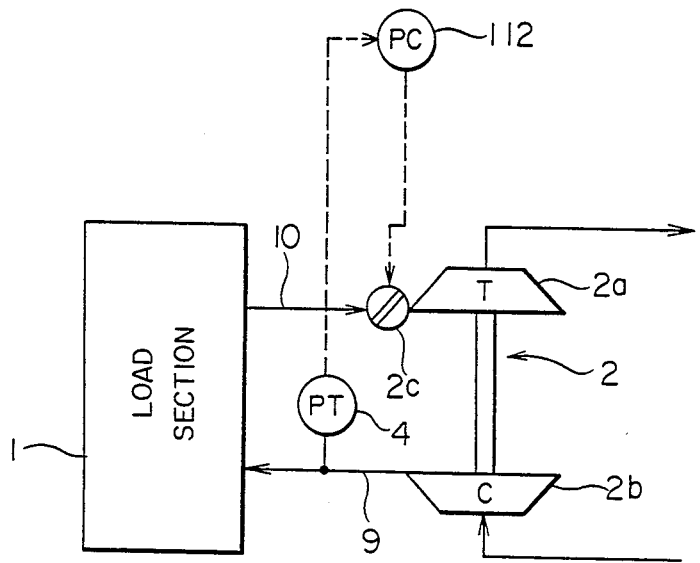
FIG. 2 is a circuit diagram showing a turbocompressor system in accordance with a second embodiment of the present invention.

FIG. 2 shows another embodiment of the present invention which is similar to the first-mentioned turbocompressor system as illustrated in FIG. 1 excepting that the auxiliary burner 12 and its related members including the fuel conduit 13, the branch conduit 16, the flow-rate control valves 14 and 17, the pressure controllers 15 and 18, the pressure detector 22 and the pressure controller 115 in FIG. 1 are omitted. The arrangement and operation of this embodiment other than the above are substantially similar to the first-mentioned embodiment of FIG. 1.

Figure 3:
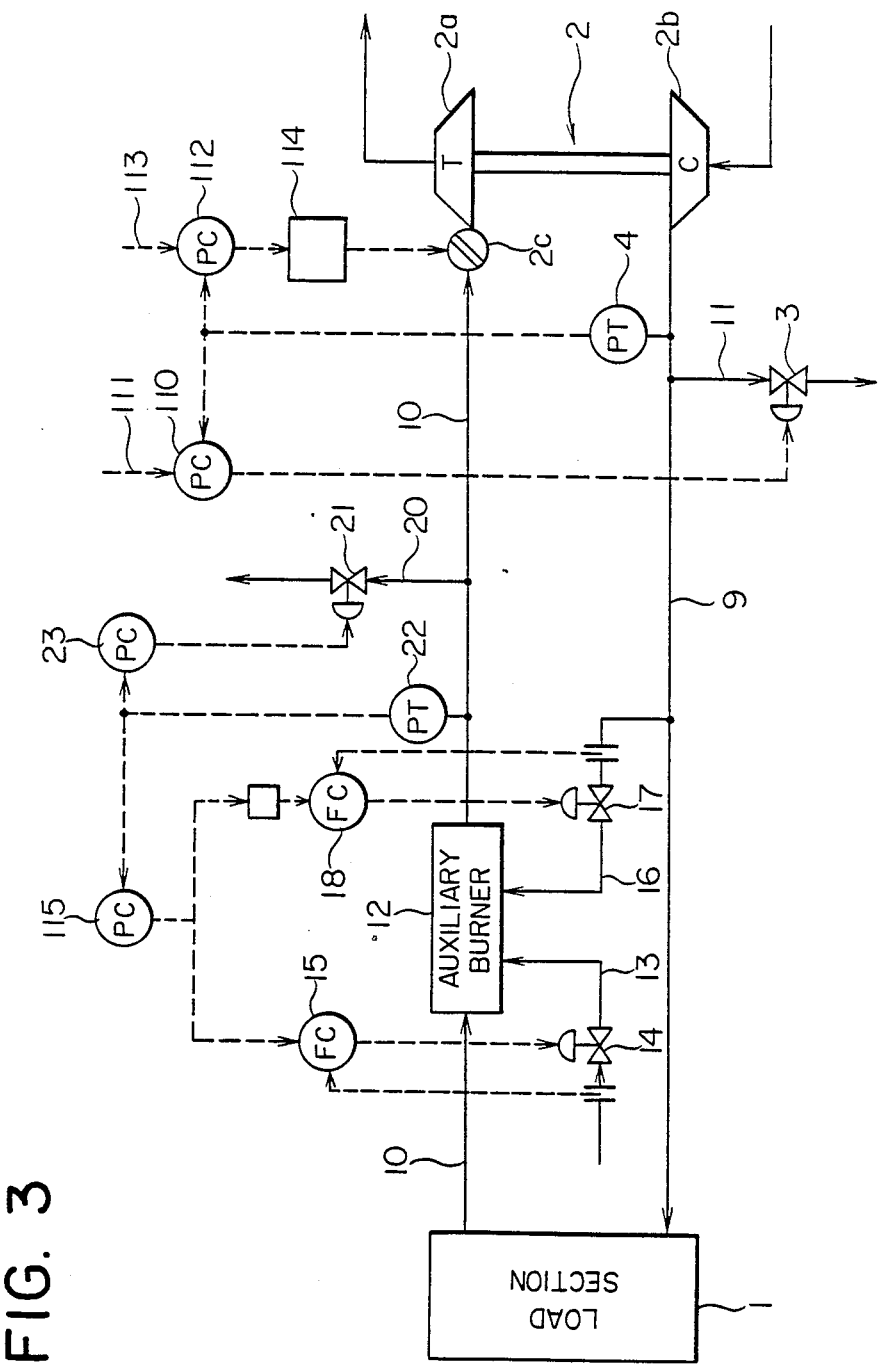
FIG. 3 is a circuit diagram showing a turbocompressor system in accordance with a third embodiment of the present invention.

FIG. 3 shows a circuit diagram of a turbocompressor system in accordance with a further embodiment of the present invention. This embodiment includes, in addition to all the elements of the first-mentioned embodiment illustrated in FIG. 1, the following elements.

Specifically, a bypass passage 20 is branched from the exhaust conduit 10 at a location between the auxiliary burner 12 and the flow control valve 2c so as to discharge a part of the exhaust gases from the load section 1 and the auxiliary burner 12 to the ambient atmosphere while bypassing the turbine 2a. Disposed in the bypass passage 20 is a bypass valve 21, the opening degree of which is controlled by a pressure controller 23 associated with the pressure detector 22 in response to the pressure of the exhaust gases in the exhaust conduit 10 detected by the pressure detector 22. Thus, by appropriately controlling the opening degree of the bypass valve 21 in response to the detected exhaust gas pressure in the exhaust conduit 10 under the action of the pressure controller 23, the output power of the turbine 2a can be properly adjusted, thereby regulating the pressure of the compressed air delivered from the compressor 2b.

Further, the opening degree of the flow control valve 2c is controlled by the pressure controller 112 through the intermediary of a computing element 114 in the form of a limiter. The pressure controller 112 is input with a first predetermined pressure value 113, and the limiter 114 functions such that when a command signal issued from the pressure controller 112 for controlling the opening degree of the flow control valve 2c is larger than an upper limit value, the computing element 114 limits the opening degree of the flow control valve 2c to an upper limit level, and when a command signal issued from the pressure controller 112 is smaller than a lower limit value, the computing element 114 limits the opening degree of the flow control valve 2c to a lower limit level.

A vent passage 11 is branched from the air conduit 9 connecting the compressor 2b and the load section 1 for venting a part of compressed air delivered from the compressor 2b to the ambient atmosphere so as to regulate the amount of the compressed air to be supplied to the load section 1. Disposed in the vent passage 11 is a vent valve 3, the opening degree of which is adapted to be controlled by a pressure controller 110 in accordance with the delivery pressure of the air from the compressor 2b detected by the pressure detector 4. The pressure controller 110 is input with a second predetermined pressure value 111 which is slightly larger than the first predetermined pressure value 113.

According to this embodiment, the pressure of the exhaust gases supplied to the turbine 2a is controlled to be at a prescribed level by various ways as described below. Specifically, the exhaust gas pressure is controlled firstly by regulating the combustion of fuel in the auxiliary burner 12 by adjusting the opening degrees of the respective flow-rate control valves 14 and 17 through the action of the first control means including the pressure controller 115 and the flow-rate controllers 15 and 18 in response to the pressure of the exhaust gases from the load section 1 and the auxiliary burner 12 detected by the pressure detector 22, as described in detail with reference to the first-mentioned embodiment illustrated in FIG. 1; secondly by adjusting the opening degree of the bypass valve 21 in the bypass passage 20 by means of the pressure controller 23 in response to the pressure of the exhaust gases detected by the pressure detector 22, thirdly by adjusting the opening degrees of the flow control valve 2c and the vent valve 3 by means of the pressure controllers 112 and 110 and the computing element 114 in response to the pressure of the compressed air from the compressor 2b detected by the pressure detector 4; or by any combination of the above-mentioned measures, whereby the output power of the turbine 2a is controlled to appropriately regulate the delivery pressure of the compressed air from the compressor 2b in a feedback manner.

More particularly, the pressure controller 112 operates to control the opening degree of the flow control valve 2c on the basis of the compressor delivery pressure detected by the pressure detector 4 and the first predetermined pressure value 113 in the following manner. When the detected compressor delivery pressure is smaller than the first predetermined pressure value 113, the pressure controller 112 acts to increase the opening degree of the flow control valve 2c for increased output power of the turbine 2a whereby the flow rate of the air delivered from the compressor 2b is increased to raise the compressor delivery pressure toward the first predetermined pressure value 113. On the other hand, the limiter 114 functions to prevent any excessive decrease or increase in the opening degree of the flow control valve 2c beyond a predetermined minimum or maximum opening degree, thereby ensuring that the opening degree of the flow control valve 2c is always maintained within a prescribed range which is higher than the minimum opening degree and lower than the maximum opening degree.

The pressure controller 110 is given the second predetermined pressure value 111 slightly larger than the first predetermined pressure value 113, as described above, and operates to control the opening degree of the vent valve 3 on the basis of the delivery pressure of the compressor 2b detected by the pressure detector 4 and the second predetermined pressure value 111 in a manner such that when the detected compressor delivery air pressure is higher than the second predetermined pressure value 111, the opening degree of the valve 3 is increased so as to increase the amount of compressed air vented to the ambient atmosphere via the vent passage 11, whereby the delivery pressure of the air from the compressor 2b is decreased toward the second predetermined pressure value 111. Thus, in this case, the compressor delivery pressure is controlled to be at the second pressure 111 in a feedback manner.

Consequently, if the compressor delivery pressure is lower than the first predetermined pressure value 113 and hence the second predetermined pressure value 111, the pressure controller 112 acts to increase the opening degree of the flow control valve 2c toward the maximum level, and at the same time, the pressure controller 110 acts to decrease the opening degree of the vent valve 3 toward the fully closed state so as to raise the compressor delivery pressure. After the vent valve 3 has been fully closed, the pressure controller 110 can no more control the pressure of compressed air delivered from the compressor 2b, but in this case, the pressure controller 112 is still effective to control the compressor delivery pressure to be at the first predetermined pressure value 113.

If the delivery pressure of the compressor 2b is higher than the second predetermined pressure value 111 and hence the first predetermined pressure value 113, the pressure controller 112 acts to decrease the opening degree of the flow control valve 2c toward the minimum level, and at the same time, the pressure controller 110 acts to increase the opening degree of the vent valve 3 toward the maximum level so as to lower the compressor delivery pressure. When the flow control valve 2c has been closed to the minimum opening degree, the pressure controller 112 can no more control the flow rate of the exhaust gases supplied to the turbine 2a, but in this case, the pressure controller 110 is still effective to control the compressor delivery pressure to be at the second predetermined pressure value 111.

In cases where the delivery pressure of the air from the compressor 2b is higher than the first predetermined pressure value 113 and lower than the second predetermined pressure value 111, the pressure controller 112 acts to decrease the opening degree of the flow control valve 2c toward the minimum level so as to lower the compressor delivery pressure to the first predetermined pressure value 113, and simultaneous with this, the pressure controller 110 acts to decrease the opening degree of the vent valve 3 toward the fully closed state so as to raise the compressor delivery pressure to the second predetermined pressure value 111. On this occasion, when the flow control valve 2c has been closed to the minimum opening degree and the vent valve 3 has been fully closed, both the pressure controllers 110 and 112 become no more effective, but at this time, the compressor delivery pressure is between the first and second predetermined pressure values 113 and 111 and hence normal so that there is no problem at all.

In order to prevent a surging phenomenon, it is possible to limit the opening degree of the flow control valve 2c in a programmed manner or to restrict the movable range of the flow control valve 2c in a mechanical way, but in this case, if the flow control valve 2c has been closed to the minimum opening degree when the compressor delivery pressure is higher than the first predetermined pressure value 113, the pressure controller 112 becomes no more effective, causing a problem that the compressor delivery pressure can not be controlled in a positive manner. In this case, however, according to this embodiment shown in FIG. 3, the opening degree of the flow control valve 2c is limited between the maximum and minimum opening degrees by means of the limiter 114 so as to prevent such a surging phenomenon.

Although in the above-described embodiment of FIG. 3, the limiter 114 is provided separately from the pressure controller 112, the pressure controller 112 may be so constructed as to perform the function of the limiter 114.

Figure 4:
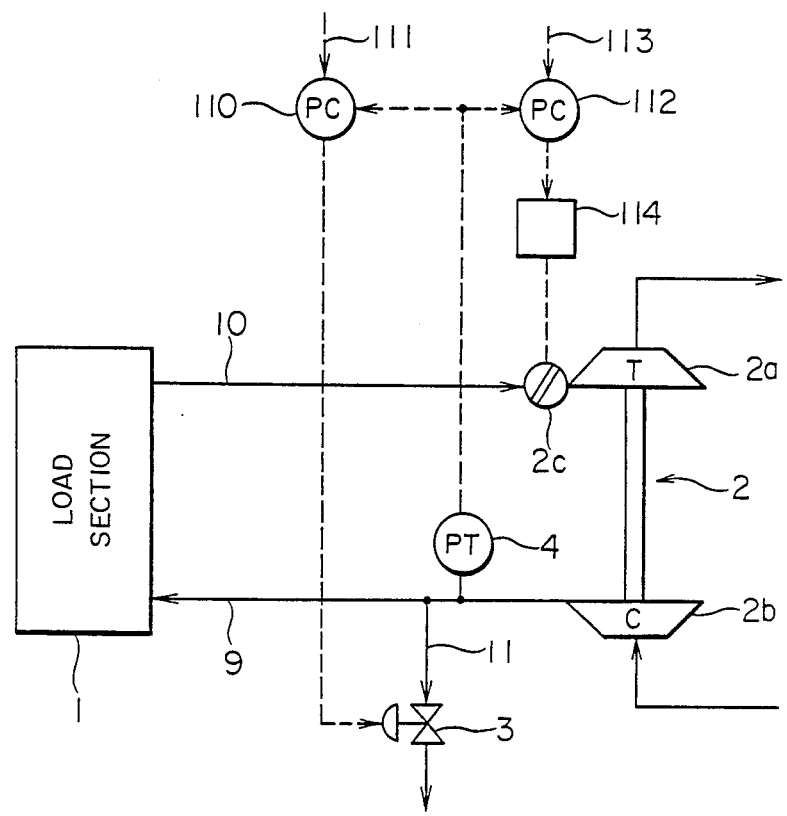
FIG. 4 is a circuit diagram showing a turbocompressor system in accordance with a fourth embodiment of the present invention.

FIG. 4 shows a still further embodiment of the present invention which is similar to the embodiment shown in FIG. 3 excepting that the auxiliary burner 12 and its related elements 13 through 18 and 115 as well as the bypass passage 20, the bypass valve 21 and the pressure controller 23 in FIG. 3 are omitted. The arrangement and operation of the this embodiment other than the above are identical to those of the embodiment shown in FIG. 3.

Figure 5:
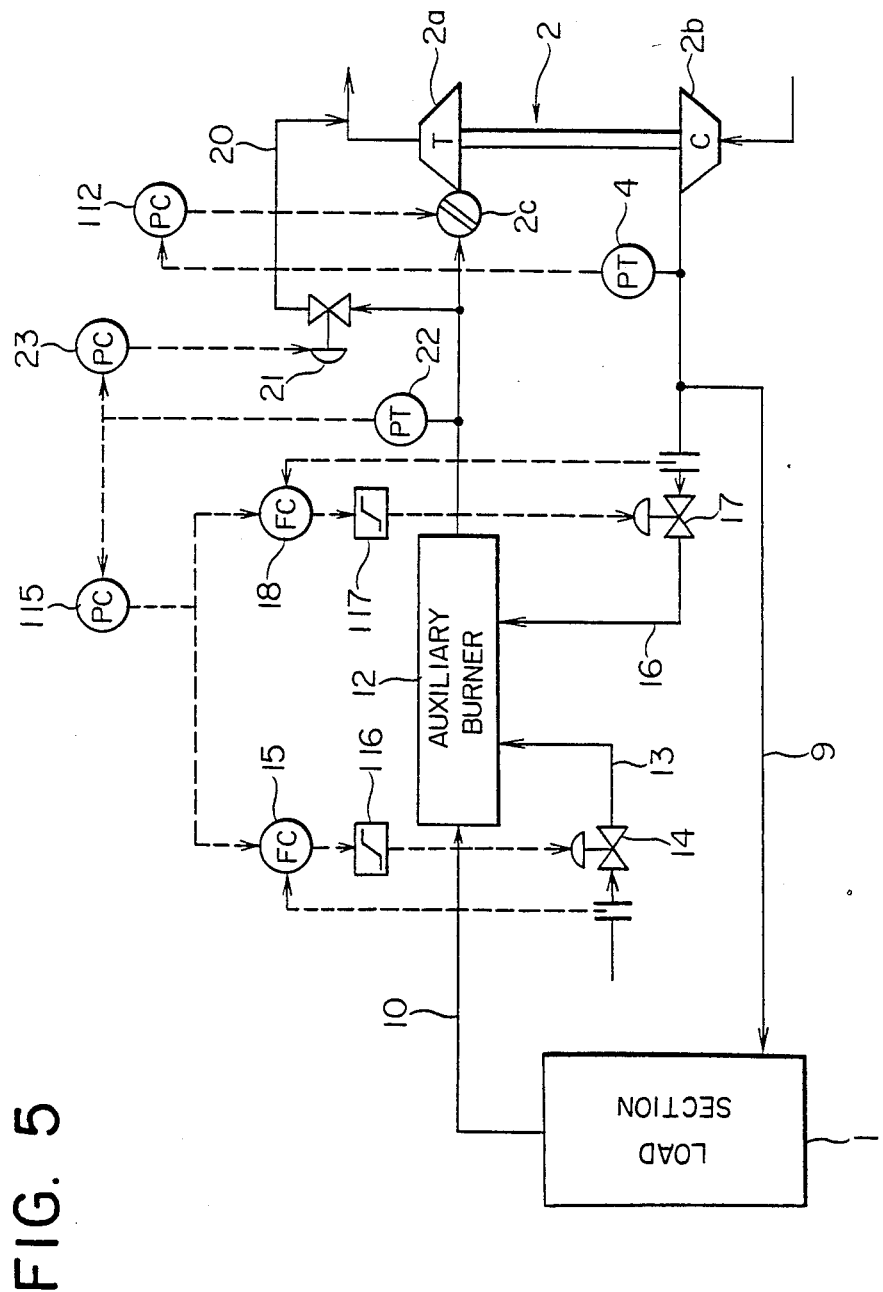
FIG. 5 is a circuit diagram showing a turbocompressor system in accordance with a fifth embodiment of the present invention.

FIG. 5 shows a yet further embodiment of the present invention which is similar to the first-mentioned embodiment shown in FIG. 1 excepting that there are provided computing elements 116 and 117 each in the form a limiter for preventing the opening degrees of the flow-rate control valves 14 and 17 in the fuel conduit 13 and the branch conduit 16 from being reduced below respective minimum opening degrees, and there is also provided a bypass passage 20 with a bypass valve 21, the opening degree of which is controlled by a pressure controller 23 in response to the exhaust gases at the inlet side of the turbine 2a detected by a pressure detector 22.

In operation of this embodiment, for example, assume that the turbocompressor system of this embodiment operates with the amount of air to be supplied to the load section 1 being changed in accordance with variation in the load on the load section 1. In this case, when the load varies from a high value to a low value, the amount of air required of the load section 1 decreases so that the pressure of air delivered from the compressor 2b is being raised. When the compressor delivery pressure detected by the pressure detector 4 becomes higher than a prescribed value, the pressure controller 112 operates to reduce the opening degree of the flow control valve 2c in response to the detected air pressure delivered from the compressor 2b whereby the output pressure of the turbine 2a is decreased to reduce the amount of air delivered from the compressor 2b, thus lowering the compressor delivery air pressure In this manner, the compressor delivery air pressure is controlled to be at a prescribed level.

In accordance with the decreasing opening degree of the flow control valve 2c the flow rate of the exhaust gases to be fed to the turbine 2a is reduced, and on the other hand, the reduction in the flow rate of the exhaust gas flowing from the load section 1 to the turbine 2a is generally delayed in comparison with the reduction in the flow rate of the air delivered from the compressor 2b to the load section 1 due to the volume of gas in the load section 1 so that the exhaust gas pressure at the inlet side of the turbine 2a tends to be increased. However, such a phenomenon is instantaneous and at the time when the load variation ends, the flow rate of the exhaust gas discharged from the load section 1 will decrease to a level corresponding to the load (low load) so that the exhaust gas pressure at the inlet side of the turbine 2a is about to be accordingly reduced. Upon such an instantaneous rise in the exhaust gas pressure at the inlet side of the turbine 2a, the pressure controller 115 acts to reduce the intensity of combustion of fuel in the auxiliary burner 12 (that is by reducing the opening degrees of the flow-rate control valves 14 and 17 in the fuel conduit 13 and the branch conduit 16) on the basis of the exhaust gas pressure at the inlet side of the turbine 2a so as to lower the exhaust gas pressure whereby the exhaust gas pressure at the inlet side of the turbine 2a is controlled to be at a prescribed level. However, in the event that the load varies greatly, the rise in the exhaust gas pressure at the inlet side of the turbine 2a can not be suppressed only by reducing the intensity of combustion in the auxiliary burner 12 under the action of the pressure controller 115. That is, in cases where the flow rate of the exhaust gas discharged from the load section 1 is relatively large or the temperature of the exhaust gas is relatively high so that there is no need for the combustion of fuel in the auxiliary burner 12, the flow-rate control valves 14 and 17 in the fuel conduit 13 and the branch conduit 16 are closed to the respective minimum opening degrees under the action of the limiter elements 116 and 117 so that the combustion of fuel in the auxiliary burner 12 is maintained at a minimum level.

In this state, any satisfactory control on the exhaust gas pressure at the inlet side of the turbine 2a can not be effected, but the pressure controller 23, which is given the second predetermined pressure value 111 higher than the first predetermined pressure value 113 given to the pressure controller 115, operates to increase the opening degree of the bypass valve 21 in the bypass passage 20 on the basis of the exhaust gas pressure at the inlet side of the turbine 2a detected by the pressure detector 22 so as to increase the flow rate of the exhaust gases discharged to the outside through the bypass passage 20 whereby the rise in the exhaust gas pressure at the inlet side of the turbine 2a can be suppressed to be below the second predetermined pressure value 111. However, if the rise in the pressure of the exhaust gases does not reach the second predetermined pressure value 111, the exhaust gas pressure is between the first and second predetermined pressure values 113 and 111, and hence the bypass valve 21 is held fully closed. As described above, when the load variation comes near to an end, the exhaust gas pressure at the inlet side of the turbine 2a lowers to a satisfactory extent so that the bypass valve 21 is being closed to the fully closed state through the action of the pressure controller 23, and at the same time, the combustion of fuel in the auxiliary burner 12 is controlled by the pressure controller 115 in a manner such that the pressure of the exhaust gases at the inlet side of the turbine 2a is adjusted to be at the first predetermined pressure value 113.

Although in this embodiment, the delivery pressure of air from the compressor 2b is controlled to be constant by adjusting the opening degree of the flow control valve 2c under the action of the pressure controller 112, such control on the compressor delivery air pressure can be likewise effected by controlling the opening degree of a vent valve disposed in a vent passage branched from the air conduit 9. Further, control on the opening degree of the flow control valve 2c is effected in a feedback manner by means of the pressure controller 112 in response to the compressor delivery air pressure detected by the pressure detector 4, but this control can be made in a feedforward manner in accordance with the load on the load section 1. Moreover, the flow control valve 2c may be omitted.

In addition, the limiters 116 and 117 for limiting the minimum opening degrees of the flow-rate control valves 14 and 17 may be omitted and instead the flow-rate controllers 15 and 18 may be so constructed as to prevent the opening degrees of these valves 14 and 17 from being reduced below the respective minimum opening degrees. In this case, even when the combustion of fuel in the auxiliary burner 12 is at the minimum level, it is possible to control the air-fuel ration in the auxiliary burner 12 in a precise manner.

What is claimed is:

1. A turbocompressor system comprising:
   a load section requiring air for its operation and discharging exhaust gas;
   a compressor connected with said load section and delivering compressed air, which is at a pressure adjusted to a predetermined value, to said load section;
   a turbine having an inlet side connected with said load section and adapted to be driven by the exhaust gas discharged from said load section to said inlet side, said turbine being operably connected to drive said compressor;
   a flow control valve disposed at said turbine inlet side and cooperatively arranged with said turbine to directly control flow rate of all the exhaust gas supplied to said turbine inlet side; and
   a control means connected in a closed feedback loop with said compressor and said flow control valve for controlling degree of opening of said flow control valve in response singularly only to the air pressure of the compressed air delivered from said compressor whereby the pressure of the compressed air delivered from said compressor to said load section is adjusted to the predetermined value by control of exhaust gas flow rate to the inlet side of said turbine from the outlet side of said compressor through the closed feedback loop.

2. A turbocompressor system as set forth in claim 1 wherein said control means comprises:
   a pressure detector arranged in communication with said compressor in the closed feedback loop and detecting the air pressure of the compressed air delivered from said compressor; and
   a controller associated with said pressure detector and operably coupled to said flow control valve to control degree of opening of said flow control valve only in response to the singular air pressure detector.

3. A turbocompressor system as set forth in claim 1 wherein said flow control valve comprises a variable nozzle.

4. A turbocompressor system as set forth in claim 1 wherein said compressor and said turbine are mounted on a one and the same rotary shaft.

5. A turbocompressor system as set forth in claim 1 wherein said load section comprises a fuel cell power plant including a fuel cell body and a reformer and adapted to use the compressed air delivered from said compressor for producing a chemical reaction in said fuel cell body as well as for facilitating the combustion of fuel in said reformer.

6. A turbocompressor system comprising:
   a load section requiring air for its operation and discharging exhaust gas;

a compressor connected with said load section and supplying compressed air to said load section;

a turbine having an inlet side connected with said load section and adapted to be driven by the exhaust gas discharged from said load section to said inlet side, said turbine being operably connected with said compressor for driving thereof;

a flow control valve disposed at said turbine inlet side and cooperatively arranged with said turbine to directly control flow rate of all exhaust gas supplied to said turbine inlet side;

a first control means, operably connected with said compressor and said flow control valve, for controlling degree of opening of said flow control valve in response to pressure of the compressed air delivered from said compressor;

an auxiliary burner communicating with said turbine inlet side through said flow control valve; and a second control means, operably connected with said flow control valve, for controlling combustion of fuel in said auxiliary burner in response to pressure of the exhaust gas discharge from said load section.

7. A turbocompressor system as set forth in claim 6 wherein said second control means comprises:

a conduit connecting said auxiliary burner to said turbine inlet side through said flow control valve;

a pressure detector disposed in said conduit in communication with said flow control valve and responsive to the exhaust gas pressure at said turbine inlet side; and a controller associated with said pressure detector and operably coupled to said auxiliary burner to control amount of fuel to be fed to said auxiliary burner and amount of air to be fed to said auxiliary burner in response to operation of said control valve.

8. A turbocompressor system as set forth in claim 6 wherein said first control means comprises:

a pressure detector arranged in communication with said compressor and detecting the air pressure of the compressed air delivered from said compressor; and a controller associated with said pressure detector and adapted to control degree of opening of said flow control valve in response singularly only to the air pressure detected by said pressure detector.

9. A turbocompressor system as set forth in claim 6 wherein said flow control valve comprises a variable nozzle.

10. A turbocompressor system as set forth in claim 6 wherein said compressor and said turbine are mounted on one and the same rotary shaft.

11. A turbocompressor system as set forth in claim 6 wherein a part of the air delivered from said compressor is fed to said auxiliary burner.

12. A turbocompressor system comprising:

a load section requiring air for its operation and discharging exhaust gas;

a compressor connected with said load section and delivering compressed air to said load section;

a turbine having an inlet side connected with said load section and adapted to be driven by the exhaust gas discharged from said load section to said inlet side, said turbine being operably connected with said compressor for driving thereof;

means for maintaining constant the compressor delivery air pressure, said means comprising:

a flow control valve disposed at said turbine inlet side and cooperatively arranged with said turbine to directly control flow rate of all the exhaust gas supplied to said turbine inlet side; and a control means connected in a closed feedback loop with said compressor and said flow control valve for controlling degree of opening of said flow control valve in response singularly to the compressor delivery air pressure whereby the compressor delivery air pressure is adjusted to a second predetermined value higher than the first predetermined value by control of exhaust gas flow rate to the inlet side of said turbine through the closed feedback loop.

13. A turbocompressor system as set forth in claim 12 wherein said control means comprises:

a pressure detector arranged in communication with said compressor and detecting the singular air pressure of the air delivered from said compressor; and a first controller operably coupled to said pressure detector and said flow control valve and adapted to control the opening degree of said flow control valve only in response to the singular air pressure detected by said pressure detector.

14. A turbocompressor system as set forth in claim 12 wherein said flow control valve comprises a variable nozzle.

15. A turbocompressor system as set forth in claim 12 wherein said compressor and turbine are mounted on one and the same rotary shaft.

16. A turbocompressor system as set forth in claim 12 further comprising a limiter means for defining a maximum limit and minimum limit of the opening degree of said flow control valve.

17. A turbocompressor system as set forth in claim 12 further comprising:

an auxiliary burner between said load section and communicating with said turbine inlet side through said flow control valve; and a further control means, operably connected with said flow control valve, for controlling combustion of fuel in said auxiliary burner in response to operation of said flow control valve to adjust the pressure of the exhaust gas at said turbine inlet side to a predetermined level.

18. A turbocompressor system as set forth in claim 18 wherein said further control means comprises:

a conduit connecting said auxiliary burner to said turbine inlet side through said flow control valve;

a pressure detector disposed in said conduit in communication with said flow control valve and responsive to exhaust gas pressure of the exhaust gas at said turbine inlet side; and a controller associated with said pressure detector and operably coupled to said auxiliary burner to control amount of fuel fed to said auxiliary burner and amount of air fed to said auxiliary burner in response to operation of said control valve.

19. A turbocompressor system as set forth in claim 17 further comprising an exhaust-gas venting means, operably connected with said control valve, for venting exhaust gases discharged from said load section and said auxiliary burner to the ambient atmosphere in response to operation of said flow control valve.

20. A turbocompressor system as set forth in claim 19 wherein said exhaust-gas venting means comprises:

a conduit connecting said auxiliary burner to said turbine inlet side through said flow control valve;

a vent passage branched from said conduit and leading to the ambient atmosphere;

a vent valve disposed in said vent passage for controlling the flow rate of the exhaust gas vented to the atmosphere;

a pressure detector responsive to the exhaust gas pressure at said turbine inlet side; and a controller associate with said pressure detector and operably coupled to said vent valve to control degree of opening of said vent valve in response to operation of said flow control valve.

21. A turbocompressor system as set forth in claim 12 further comprising:

an auxiliary burner communicating with said turbine inlet side through said flow control valve; and an exhaust-gas venting means, operably connected with said flow control valve, for venting exhaust gas discharged from said load section and said auxiliary burner to the ambient atmosphere in response to operation of said control valve.

22. A turbocompressor system as set forth in claim 21 wherein said exhaust-gas venting means comprises:

a conduit connecting said auxiliary burner to said turbine inlet side through said flow control valve;

a vent passage branched from said conduit and leading to the ambient atmosphere;

a vent valve disposed in said vent passage for controlling the flow rate of the exhaust gas vented to the atmosphere;

a pressure detector responsive to pressure of exhaust gas discharged from said load section at said turbine inlet side; and a controller associated with said pressure detector and operably coupled to said vent valve to control degree of opening of said vent valve in response to operation of said flow control valve.

23. A turbocompressor system as set forth in claim 12 wherein said load section comprises a fuel cell power plant including a fuel cell body and a reformer and adapted to use the compressed air delivered from said compressor for producing a chemical reaction in said fuel cell body as well as for facilitating combustion in said reformer.

24. A turbocompressor system comprising:

a load section requiring air for its operation and discharged exhaust gas;

a compressor connected with said load section for supplying compressed air to said load section;

a turbine having an inlet side connected with said load section and adapted to be driven by the exhaust gas discharged from said load section to said inlet side, said turbine being operably connected with said compressor for driving thereof;

a flow control valve disposed at said turbine inlet side and cooperatively arranged with said turbine to directly control the flow rate of all exhaust gas supplied to said turbine inlet side;

a conduit connected to said turbine inlet side;

an auxiliary burner connected by said conduit to said turbine inlet side through said flow control valve;

a second control means, operably connected with said flow control valve, for controlling the combustion of fuel in said auxiliary burner in response to the direct control by said flow control valve of all exhaust gas at said turbine inlet side to adjust the pressure of the exhaust gas at said turbine inlet side to a first predetermined level;

a bypass passage branched from said conduit and leading toward the ambient atmosphere;

a bypass valve operably arranged in said bypass passage to control the flow rate of the exhaust gas vented to the atmosphere and bypassing said turbine; and a third control means connected in a closed feedback loop with said bypass valve and said flow control valve for controlling degree of opening of said bypass valve in response to the direct control of all exhaust gas at said turbine inlet side to adjust the exhaust gas pressure at said turbine inlet side to a second predetermined level higher than said first predetermined level.

25. A turbocompressor system as set forth in claim 24 wherein said second control means comprises:

a pressure detector disposed in said conduit in communication with said control valve and responsive to the exhaust gas pressure at said turbine inlet side; and a controller associated with said pressure detector and operably coupled to said auxiliary burner to control the amount of fuel fed to said auxiliary burner and the amount of air fed to said auxiliary burner in response to the pressure of the exhaust gas detected by said pressure detector.

26. A turbocompressor system as set forth in claim 24 wherein said first control means comprises:

a pressure detector operably connected to said compressor to detect the pressure of the air delivered from said compressor; and a controller associated with said pressure detector and operably coupled to said flow control valve to control degree of opening of said flow control valve in response singularly only to the air pressure detected by said pressure detector.

27. A turbocompressor system as set forth in claim 24 further comprising a limited means for defining a minimum level of the combustion of fuel in said auxiliary burner.

28. A turbocompressor system as set forth in claim 24 wherein said flow control valve comprises a variable nozzle.

29. A turbocompressor system as set forth in claim 24 wherein said compressor and said turbine are mounted on one and the same rotary shaft.

30. A turbocompressor system as set forth in claim 24 wherein a part of the air delivered form said compressor is fed to said auxiliary burner.

31. A turbocompressor system as set forth in claim 24 wherein said load section comprises a fuel cell power plant including a fuel cell body and a reformer and adapted to use the compressed air delivered from said compressor for producing a chemical reaction in said fuel cell body as well as for facilitating combustion in said reformer.

32. A method for controlling a turbocompressor system comprising:

delivering compressed air from a compressor to a load section;

feeding exhaust gas discharged from said load section to a turbine which is operably connected with said compressor and driving said turbine and said compressor;

maintaining constant compressor delivery air pressure by directly controlling, through regulation of a flow control valve disposed at an inlet side of said turbine, pressure of all exhaust gas fed to said turbine; and controlling degree of opening of said flow control valve in response singularly only to the compressor delivery air pressure.

33. A method for controlling a turbocompressor system as set forth in claim 32 wherein said load section comprises a fuel cell power plant including a fuel cell body and a reformer and wherein said method further comprises delivering the compressed air from said compressor in said load section for producing a chemical reaction in said fuel cell as well as for facilitating combustion in said reformer.

34. A method for controlling a turbocompressor system comprising:

delivering compressed air from a compressor to a load section;

feeding exhaust gas discharged from said load section to a turbine which is operably connected with said compressor and driving said turbine and said compressor;

maintaining constant compressor delivery air pressure by directly controlling, through regulation of a flow control valve disposed at an inlet side of said turbine, pressure of all exhaust gas fed to said turbine;

controlling degree of opening of said flow control valve in response to the compressor delivery air pressure;

combusting fuel in an auxiliary burner disposed in a conduit connecting said load section and said turbine for increasing the output power of said turbine; and controlling the combustion of fuel in said auxiliary burner in response to the pressure of the exhaust gas to adjust the pressure of the exhaust gas at said turbine inlet side to a predetermined level.

35. A method for controlling a turbocompressor system as set forth in claim 34 further comprising:

detecting pressure of the exhaust gas from said load section and said auxiliary burner at said inlet side of said turbine;

maintaining constant compressor delivery air pressure by directly controlling, through regulation of a flow control valve disposed at an inlet side of aid turbine, pressure of all exhaust gas fed to said to said turbine; and controlling the amount of fuel to be fed to said auxiliary burner and the amount of air to be fed to said auxiliary burner in response to the detected pressure of the exhaust gas.

36. A method for controlling a turbocompressor system as set forth in claim 34 further comprising:

detecting the pressure of the air delivered from said compressor; and controlling the opening degree of said flow control valve in response to the detected air pressure.

37. A method for controlling a turbocompressor system comprising:

delivering compressed air from a compressor to a load section;

feeding exhaust gas discharged from said load section to a turbine which is operably connected with said compressor and driving said turbine and said compressor;

directly controlling, through regulation of a flow control valve disposed at an inlet side of said turbine, pressure of all exhaust gas fed to said turbine; and controlling degree of opening of said low control valve in response singularly only to the compressor delivery air pressure.

38. A method for controlling a turbocompressor system as set forth in claim 37 further comprising defining a maximum limit and a minimum limit of the opening degree of said flow control valve.

39. A method for controlling a turbocompressor as set forth in claim 37 further comprising:

combusting fuel in an auxiliary burner disposed in a conduit connected said load section and said turbine to increase the output power of said turbine; and controlling the amount of fuel in said auxiliary burner in response to said pressure control, through said flow control valve, of all exhaust gas fed to said turbine to adjust the pressure of the exhaust gas at an inlet side of said turbine to a predetermined level.

40. A method for controlling a turbocompressor system as set forth in claim 37 further comprising bypassing a part of the exhaust gas discharged from said load section to the ambient atmosphere in response to said control pressure, through said flow control valve, of all exhaust gas fed to said turbine.

41. A method for controlling a turbocompressor system as set forth in claim 39 further comprising bypassing a part of the exhaust gas discharged from said load section and said auxiliary burner to the ambient atmosphere in response to said control pressure, through said flow control valve, of all exhaust gas fed to said turbine.

42. A method for controlling a turbocompressor system as set forth in claim 37 wherein said load section comprises a fuel cell power plant including a fuel cell body and a reformer and wherein said method further comprises using the compressed air delivered from said compressor for producing a chemical reaction in said fuel cell body as well as for facilitating combustion in said reformer.

43. A method for controlling a turbocompressor system comprising:

delivering compressed air from a compressor to a load section;

feeding exhaust gas discharged from said load section to a turbine which is operably connected with said compressor and driving said turbine;

maintaining constant compressor delivery air pressure by directly controlling, through regulation of a flow control valve disposed at an inlet side of said turbine, pressure of all exhaust gas fed to said turbine; and controlling degree of opening of said flow control valve in response to the compressor delivery air pressure;

combusting fuel in an auxiliary burner disposed in a conduit connecting said load section and said turbine for increasing the output power of said turbine;

controlling the combustion of fuel in said auxiliary burner in response to the pressure of said control pressure, through said flow control valve, of all, exhaust gas fed to said turbine to adjust the pressure of the exhaust gas at said inlet side of said turbine to a first predetermined level;

bypassing a part of exhaust gas from said load section and said auxiliary burner toward the ambient atmosphere;

controlling the flow rate of the exhaust gas discharged to the atmosphere bypassing said turbine by means of a bypass valve disposed in a bypass passage; and controlling degree of opening of said bypass valve in response to said control pressure, through said flow control valve, of all exhaust gas fed to said turbine to adjust the pressure of the exhaust gas at said turbine inlet side to a second predetermined level.

44. A method for controlling a turbocompressor system as set forth in claim 43, further comprising;

detecting the pressure of the exhaust gases from said load section and said auxiliary burner at said inlet side of said turbine; and controlling the amount of fuel to be fed to said auxiliary burner and the amount of air to be fed to said auxiliary burner in response to the detected pressure of the exhaust gases.

45. A method for controlling a turbocompressor system as set forth in claim 43 further comprising defining a minimum level of the combustion of fuel in said auxiliary burner.

46. A method for controlling a turbocompressor system as set forth in claim 43 further comprising feeding a part of the air delivered from said compressor to said auxiliary burner.

47. A method for controlling a turbocompressor as set forth in claim 43 wherein said load section comprises a fuel cell power plant including a fuel cell body and a reformer and wherein said method further comprises using the compressed air delivered from said compressor for producing a chemical reaction in said fuel cell body as well as for facilitating combustion in said reformer.

48. A method for controlling a fuel cell power plant system comprising:

reforming a hydrocarbon fuel into a hydrogen enriched gas by means of a reformer;

supplying the hydrogen enriched gas to a fuel cell body having a fuel electrode and an air electrode;

feeding exhaust gas discharged from said reformer or surplus air at an outlet of said air electrode to a turbo compressor having a turbine and a compressor driving said turbine;

driving said compressor by means of said turbine and for supplying compressed air to said fuel cell body and said reformer;

maintaining constant compressor delivery air pressure by directly controlling, through regulation of a flow control valve disposed at an inlet side of said turbine, pressure of all exhaust gas fed to said turbine;

controlling degree of opening of said flow control valve in response singularly only to the compressor delivery air pressure.

* * * * *